United States Patent
Lai

(10) Patent No.: US 8,200,075 B1
(45) Date of Patent: Jun. 12, 2012

(54) CAMERA-BASED MOBILE COMMUNICATION DEVICE AND METHOD FOR CONTROLLING FLASHLIGHT THEREOF

(75) Inventor: Kun-Hui Lai, Taipei (TW)

(73) Assignee: Inventec Corporation, Taipei (TW)

( * ) Notice: Subject to any disclaimer, the term of this patent is extended or adjusted under 35 U.S.C. 154(b) by 47 days.

(21) Appl. No.: 12/980,363

(22) Filed: Dec. 29, 2010

(30) Foreign Application Priority Data

Nov. 19, 2010 (TW) .............................. 99140005 A

(51) Int. Cl.
*G03B 15/03* (2006.01)
(52) U.S. Cl. .......................... 396/50; 396/165; 396/429
(58) Field of Classification Search .................... 396/50, 396/164, 165, 429
See application file for complete search history.

(56) References Cited

U.S. PATENT DOCUMENTS

| | | | | | |
|---|---|---|---|---|---|
| 5,606,391 | A | * | 2/1997 | Aoki et al. ...................... | 396/48 |
| 5,913,078 | A | * | 6/1999 | Kimura et al. .................. | 396/50 |
| 7,706,674 | B2 | * | 4/2010 | Sugimoto et al. .............. | 396/61 |
| 7,920,205 | B2 | * | 4/2011 | Awazu .......................... | 348/371 |
| 8,121,472 | B2 | * | 2/2012 | Forutanpour et al. .......... | 396/225 |
| 2005/0134706 | A1 | * | 6/2005 | Moon et al. .................... | 348/236 |
| 2008/0181597 | A1 | * | 7/2008 | Tamura .......................... | 396/164 |
| 2008/0193119 | A1 | * | 8/2008 | Miyazaki ....................... | 396/157 |
| 2009/0153689 | A1 | * | 6/2009 | Shih .............................. | 348/222.1 |
| 2010/0086217 | A1 | * | 4/2010 | Matsuhira ...................... | 382/199 |
| 2011/0097067 | A1 | * | 4/2011 | Osawa ........................... | 396/165 |
| 2011/0249142 | A1 | * | 10/2011 | Brunner ........................ | 348/229.1 |

FOREIGN PATENT DOCUMENTS

| | | |
|---|---|---|
| TW | 200931287 | 7/2009 |
| TW | I316161 | 10/2009 |
| TW | 201013158 | 4/2010 |

* cited by examiner

*Primary Examiner* — W. B. Perkey
(74) *Attorney, Agent, or Firm* — CKC & Partners Co., Ltd.

(57) ABSTRACT

A camera-based mobile communication device includes a light sensor, a camera module, a flashlight, and a microprocessing unit (MPU). The light sensor is operable to detect a brightness value of an external light source. The camera module is operable to photograph an image. The flashlight is operable to generate a flash. The MPU is electrically connected to the light sensor, the camera module, and the flashlight. The MPU includes a comparison module, a face recognizing module, and a flashlight control module. The comparison module is operable to compare the brightness value with a threshold brightness value. The face recognizing module is operable to determine whether there exists a facial feature in the image. The flashlight control module is operable to turn on the flashlight when the detected brightness value is greater than the threshold brightness value and the facial feature is recognized from the image.

20 Claims, 4 Drawing Sheets

CAMERA-BASED MOBILE COMMUNICATION DEVICE AND METHOD FOR CONTROLLING FLASHLIGHT THEREOF

RELATED APPLICATIONS

This application claims priority to Taiwan Application Serial Number 099140005, filed Nov. 19, 2010, which is herein incorporated by reference.

BACKGROUND

1. Field of Invention

The present invention relates to a mobile communication device, and more particularly, to a camera-based mobile communication device with a backlight-condition determination mechanism.

2. Description of Related Art

With the development of science and technology, it is possible to integrate a mobile phone with a digital camera. Although pixel quality of a mobile phone's built-in camera and image effects of the same still cannot reach the standards of common digital cameras currently, yet a camera mobile phone actually provides a user with "ready to photograph" convenience.

At present, more and more users join in mobile photographing. From the analysis of motivation for the mobile photographing, a user may use a camera mobile phone to photograph easily anytime anywhere, so that the user not only can keep every moment of sweet memory in life but also can record every detail at work or in life and entertainment. These factors closely related to daily life result in the rapid development of camera mobile phone.

In general, since the development of pixel quality of a camera mobile phone is limited, the development of a camera mobile phone's photography function mainly trends to collaborating with auxiliary functions, such as auto zoom, auto-focus, anti-shake and anti-red-eye, etc.

However, when a camera mobile phone under a backlight situation, a character in the picture is often too dark to have a satisfying photographic quality, because of too strong background light. The current camera mobile phone is not equipped with the function for overcoming the problems caused by backlight. Therefore, the camera mobile phone needs further improvements.

SUMMARY

The present invention aims to provide a camera-based mobile communication device, thereby alleviating the problem that an object to be photographed may appear darker relative to a background when the camera-based mobile communication device is under a backlight situation.

In order to achieve the aforementioned object, a technical aspect of the present invention relates to a camera-based mobile communication device including a light sensor, a camera module, a flashlight, and a micro-processing unit (MPU). The light sensor is operable to detect a brightness value of an external light source. The camera module is operable to capture an image. The flashlight is operable to generate a flash.

In addition, the MPU is electrically connected to the light sensor, the camera module, and the flashlight. The MPU includes a comparison module, a face recognizing module, and a flashlight control module. The comparison module is operable to compare the brightness value with a threshold brightness value. The face recognizing module is operable to determine whether there exists a facial feature in the image. The flashlight control module is operable to turn on the flashlight when the comparison module determines that the brightness value is greater than the threshold brightness value; and the face recognizing module recognizes the facial feature from the image.

According to an embodiment of the present invention, the camera-based mobile communication device further includes a global positioning system (GPS) module. The GPS module is operable to obtain a latitude and longitude data about the position of the camera-based mobile communication device. The MPU further includes a solar azimuth calculating module. The solar azimuth calculating module is operable to calculate the solar azimuth of the position of the camera-based mobile communication device based on the latitude and longitude data and a current time.

According to another embodiment of the present invention, the camera-based mobile communication device further includes an electronic compass module. The electronic compass module is operable to obtain a photographing azimuth of the camera-based mobile communication device. The MPU further includes a backlight level calculating module. The backlight level calculating module is operable to calculate a backlight level of the camera module based on the solar azimuth and the photographing azimuth.

According to yet another embodiment of the present invention, the camera-based mobile communication device further includes an angle adjusting device. The angle adjusting device is connected to the flashlight and is operable to adjust a projection angle of the flashlight. The MPU further includes an angle control module. The angle control module is operable to control the angle adjusting device based on the backlight level.

According to a further embodiment of the present invention, the camera-based mobile communication device further includes a flashlight lens and an angle adjusting device. The flashlight lens is disposed on a light-emitting path of the flashlight and is operable to concentrate the flash. The angle adjusting device is connected to the flashlight lens and is operable to adjust an angle of the flashlight lens. The MPU further includes an angle control module. The angle control module is operable to control the angle adjusting device based on the backlight level.

Another technical aspect of the present invention relates to a flashlight control method, which is applicable to a camera-based mobile communication device, wherein the camera-based mobile communication device includes a flashlight. The flashlight control method includes: detecting a brightness value of an external light source; determining whether the brightness value is greater than a threshold brightness value; capturing an image and determining whether there exists a facial feature in the image; and, turning on the flashlight of the camera-based mobile communication device when the brightness value is determined to be greater than the threshold brightness value; and the facial feature is recognized from the image.

According to an embodiment of the present invention, the flashlight control method further includes: obtaining a latitude and longitude data about the position of the camera-based mobile communication device; calculating a solar azimuth of the position of the camera-based mobile communication device based on the latitude and longitude data and a current time; and, calculating a backlight level of the camera-based mobile communication device based on the solar azimuth.

According to another embodiment of the present invention, the flashlight control method further includes: obtaining a photographing azimuth of the camera-based mobile communication device, and calculating the backlight level of the camera-based mobile communication device based on the solar azimuth and the photographing azimuth; determining whether the backlight level is greater than a threshold backlight level value; and, turning on the flashlight of the camera-based mobile communication device when the brightness value is determined to be greater than the threshold brightness value; the facial feature is recognized from the image; and the backlight level is determined to be greater than the threshold backlight level value.

According to yet another embodiment of the present invention, the flashlight control method further includes: controlling an angle adjusting device based on the backlight level to adjust a projection angle of the flashlight.

According to a further embodiment of the present invention, the flashlight control method further includes: measuring a focal distance of a object to be photographed; and adjusting the intensity of the flashlight and the speed of a shutter based on the focal distance of the object to be photographed.

Therefore, according to the technical contents of the present invention, embodiments of the present invention provide a camera-based mobile communication device, thereby alleviating the problem that an object to be photographed may appear darker with respect to a background when the camera-based mobile communication device is under a backlight situation. Furthermore, the embodiments of the present invention can adjust a projection angle of the flashlight by detecting the solar azimuth, thereby reducing uneven brightness of an image of the photographed object when the camera-based mobile communication device is under a semi-backlight situation.

BRIEF DESCRIPTION OF THE DRAWINGS

The following and other objectives, features, advantages and embodiments of the present invention can be more fully understood, with reference made to the accompanying drawings as follows.

DETAILED DESCRIPTION

The present invention will be described in the following embodiments with reference to the accompanying drawing, but these embodiments are not intended to limit the present invention. The description of structure operation does not mean to limit its implementation order. Any device with equivalent functions that is produced from a structure formed by recombination of elements shall fall within the scope of the present invention. The drawings are only illustrative and are not made according to the original size.

Figure 1:
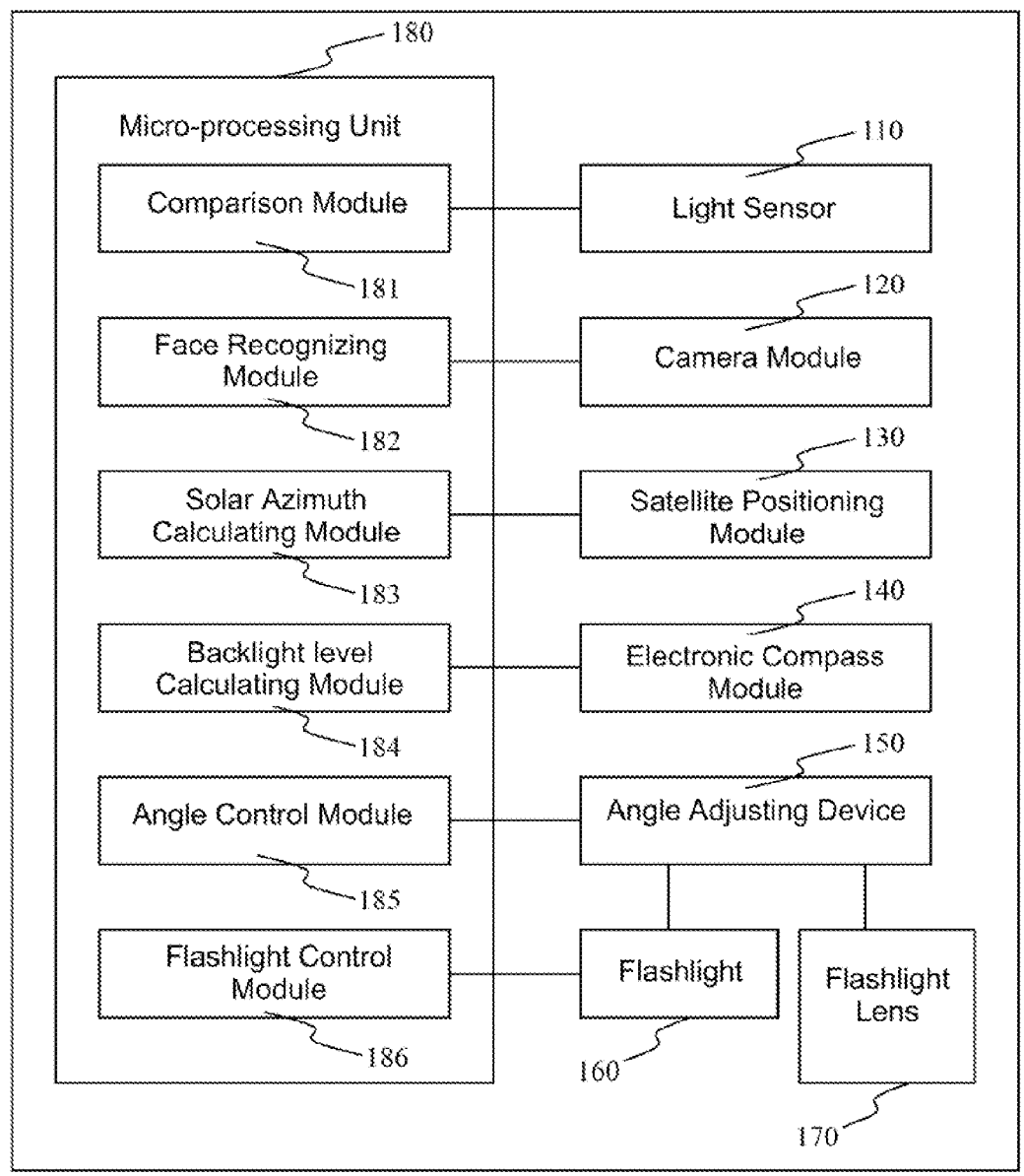
FIG. 1 is a schematic view of a camera-based mobile communication device according to an embodiment of the present invention.

FIG. 1 is a schematic view of a camera-based mobile communication device 100 according to an embodiment of the present invention. The camera-based mobile communication device 100 includes a light sensor 110, a camera module 120, a flashlight 160 and a micro-processing unit (MPU) 180. The camera-based mobile communication device 100 may be a camera mobile phone.

In addition, the MPU 180 includes a comparison module 181, a face recognizing module 182, a solar azimuth calculating module 183, a backlight level calculating module 184, an angle control module 185 and a flashlight control module 186.

As shown in FIG. 1, the light sensor 110 is electrically connected to the comparison module 181, and the camera module 120 is electrically connected to the face recognizing module 182, and the flashlight 160 is electrically connected to the flashlight control module 186.

In operation, the light sensor 110 is operable to detect a brightness value of an external light source. For example, the light sensor 110 detects a large brightness value when the sun is shining.

Then, the comparison module 181 compares the above-mentioned brightness value with a threshold brightness value. In general, a common camera mobile phone sets only one threshold value, which is used to determine whether an external light source is sufficient. When the brightness value of the external light source is smaller than the threshold value, it means that the brightness of the external light source is insufficient, and thus it is necessary to enable a flash function of the camera mobile phone. In contrast, when the brightness value is greater than the threshold value, the flash function of the camera mobile phone is disabled.

However, embodiments of the present invention additionally set a threshold brightness value different from the threshold value (the threshold brightness value is greater than the threshold value). When the brightness value of the external light source is greater than the threshold brightness value, it means that the brightness of the external light source is too sufficient and is very likely to cause a backlight situation.

Moreover, the camera module 120 is operable to capture an image. For example, a preview picture shown on a screen of the camera-based mobile communication device 100 is made by the camera-based mobile communication device 100 which first processes an image captured by the camera module 120 and then display the image on the screen.

Thereafter, the face recognizing module 182 determines whether there exists a facial feature in the image, i.e. determines whether there is a facial feature appearing in the preview picture, thereby determining whether the camera module 120 photographs a character.

Furthermore, when the comparison module 181 determines that the brightness value is greater than the threshold brightness value; and the face recognizing module 182 recognizes the facial feature from the image, i.e. when the external light source brightness for the camera-based mobile communication device 100 is adequately sufficient and the object to be photographed is a character rather than scenery, the camera-based mobile communication device 100 are very likely to be under a backlight situation, and the flashlight control module 181 controls and turns on the flashlight 160, so that the flashlight 160 generates a flash when the user presses a shutter. Consequently, this embodiment can alleviate the problem that an object to be photographed may appear darker with respect to the background when the camera-based mobile communication device 100 is under a backlight situation.

In an optional embodiment, the solar azimuth calculating module 183 can determine a solar azimuth based on a current time. For example, an azimuth of the sun is an elevation angle of 70 degrees east by south if the current time is 10 a.m.

However, the camera-based mobile communication device 100 further includes a global positioning system (GPS) module 130, wherein the GPS module 130 is operable to obtain a latitude and longitude data about the position of the camera-based mobile communication device 100. Thereafter, the solar azimuth calculating module 183 can calculate a more accurate solar azimuth of the position of the camera-based mobile communication device 100 based on the latitude and longitude data and the current time. Thus, if the camera-based mobile communication device 100 is equipped with the GPS module 130, the solar azimuth calculating module 183 can calculate a more accurate solar azimuth.

In another embodiment, the camera-based mobile communication device 100 further includes an electronic compass module 140, wherein the electronic compass module 140 can obtain a photographing azimuth of the camera-based mobile communication device 100. The backlight level calculating module 184 calculates a backlight level of the camera module 120 based on the solar azimuth and the photographing azimuth. In order to introduce the backlight level, please first refer to the following descriptions about FIGS. 2A, 2B and 2C.

Figure 2A:
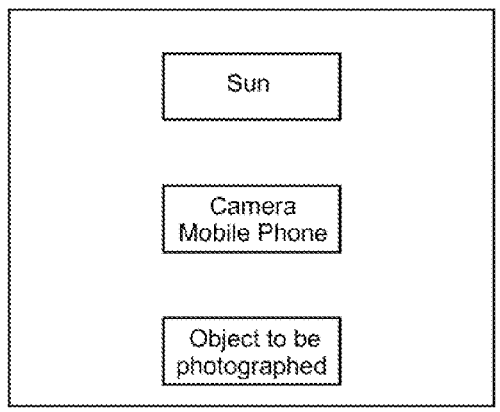
FIGS. 2A, 2B and 2C are schematic views showing a relationship among a camera-based mobile communication device, the sun and an object to be photographed according to another embodiment of the present invention.
Figure 2B:
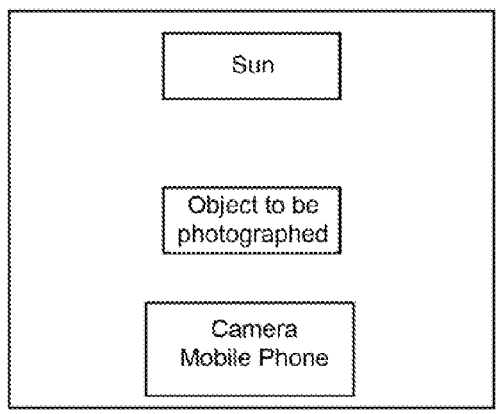
Figure 2C:
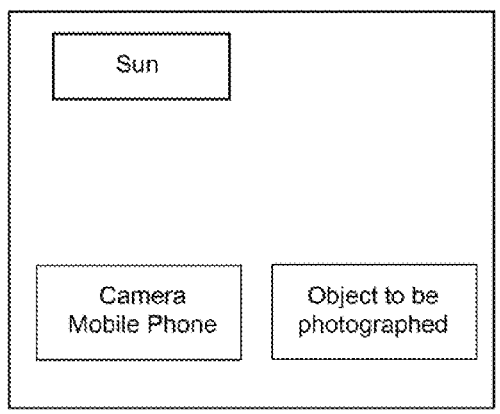

FIGS. 2A, 2B and 2C are schematic views showing a relationship among the camera-based mobile communication device 100 (a camera mobile phone), the sun and an object to be photographed according to another embodiment of the present invention. As shown in FIG. 2A, the azimuth of the sun and the photographing azimuth of the camera mobile phone are substantially the same, so that a backlight problem will not occur. In this embodiment, the solar azimuth and the photographing azimuth of the camera mobile phone are 0 degrees apart, and thus in this case the backlight level is defined as 0 degrees.

Referring to FIG. 2B, the azimuth of the sun and the photographing azimuth of the camera mobile phone are substantially opposite, thus causing a backlight problem. In this case, the solar azimuth and the photographing azimuth of the camera mobile phone are 180 degrees apart, and thus the backlight level is defined as 180 degrees. In addition, referring to FIG. 2C, a semi-backlight situation is illustrated, wherein the solar azimuth and the photographing azimuth of the camera mobile phone are 90 degrees apart. If the solar azimuth is taken as a standard azimuth and the clockwise direction is defined as a forward direction, the backlight level is 90 degrees. However, the above description does not intend to limit the present invention, and it will be apparent to those skilled in the art that the backlight level may be defined according to practical requirements without departing from the scope or spirit of the present invention.

Referring to FIG. 1, the comparison module 181 is further operable to compare the backlight level with a threshold backlight level value, wherein the threshold backlight level value can be set by a manufacturer or the user himself/herself.

Then, the flashlight control module 186 is operable to turn on the flashlight when the comparison module 181 determines that the brightness value is greater than the threshold brightness value; the face recognizing module 182 recognizes the facial feature from the image; and the backlight level is greater than the threshold backlight level value. In this way, the threshold backlight level value can be set by the manufacturer or the user as required, so that the camera-based mobile communication device 100 can obtain a desirable image.

In other embodiments, the camera-based mobile communication device 100 further includes an angle adjusting device 150, wherein the angle adjusting device 150 is connected to the flashlight 160 and is operable to adjust a projection angle of the flashlight 160. Since a left side brightness and a right side brightness of the image photographed by the camera-based mobile communication device 100 are uneven in a situation as shown in FIG. 2C, i.e. in a semi-backlight situation, the angle adjusting device 150 is required to adjust the projection angle of the flashlight 160.

Furthermore, the angle adjusting device 150 is controlled by the angle control module 185 based on the backlight level. For example, as shown in FIG. 2C, when the backlight level is 90 degrees, which represents that the sun is at a left side of the user, the angle control module 185 controls the angle adjusting device 150 based on the backlight level (90 degrees), so that the flashlight 160 fills light towards the right side of the object to be photographed. In this way, a combination of the angle adjusting device 150 and the flashlight 160 can be used to alleviate the problem that the left side brightness and the right side brightness of an image of the photographed object are uneven in a semi-backlight situation.

In an optional embodiment, the camera-based mobile communication device 100 further includes the angle adjusting device 150 and a flashlight lens 170. The flashlight lens 170 is disposed on a light-emitting path of the flashlight 160, and is operable to concentrate the flash. The angle adjusting device 150 is connected to the flashlight lens 170 and is operable to adjust an angle of the flashlight lens 170. The functions of the angle adjusting device to 150 have been described in the above and will not be described herein any more.

Furthermore, the angle control module 185 controls the angle adjusting device 150 based on the backlight level to correspondingly change the angle of the flashlight lens 170, so as to adjust a light-concentrating direction of the flashlight lens 170. For example, as shown in FIG. 2C, when the backlight level is 90 degrees, which represents that the sun is at the left side of the user, the angle control module 185 controls the angle adjusting device 150 based on the backlight level (90 degrees), so that the flashlight lens 170 concentrates light towards the right side of the object to be photographed. In this way, the flashlight lens 170 can be used together with the angle adjusting device 150 to alleviate the problem that the left brightness and the right brightness of an image of the photographed object are uneven in a semi-backlight situation.

Figure 3:
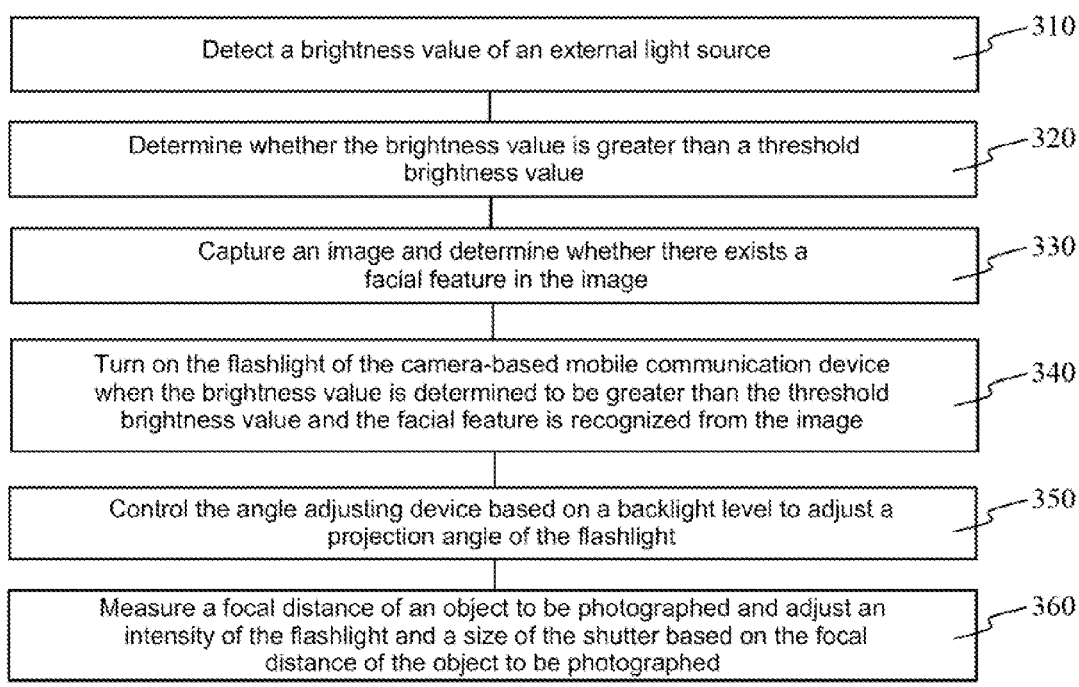
FIG. 3 is a flowchart showing a flashlight control method according to yet another embodiment of the present invention.

FIG. 3 is a flowchart showing a flashlight control method according to yet another embodiment of the present invention. Referring to both FIG. 1 and FIG. 3, a brightness value of an external light source is detected first (step 310), wherein the light sensor 110 can be used to detect the brightness value of the external light source. Next, it is determined whether the brightness value is greater than a threshold brightness value (step 320), wherein the comparison module 181 can be used to determine whether the brightness value is greater than the threshold brightness value.

Thereafter, an image is captured and it is determined whether there exists a facial feature in the image (step 330). In step 330, the camera module 120 can be used to capture the image, and the face recognizing module 182 can be used to determine whether there exists the facial feature in the image.

Subsequently, the flashlight 160 of the camera-based mobile communication device 100 is turned on when the brightness value is determined to be greater than the threshold brightness value; and the facial feature is recognized from the image (step 340).

In step 340, since the brightness value is greater than the threshold brightness value, the external light source brightness for the camera-based mobile communication device 100 is adequately sufficient. In addition, since the facial feature is recognized from the image, it can be determined that the currently object to be photographed is a character rather than scenery. Accordingly, the camera-based mobile communication device 100 are very likely to be under a backlight situation, and the flashlight control module 181 controls and turns on the flashlight 160, wherein the flashlight 160 generates a flash when the user presses the shutter. In this way, the embodiment can alleviate the problem that an object to be photographed may appear darker with respect to a background when the camera-based mobile communication device 100 is under a backlight situation.

After the step of turning on the flashlight 160, the angle adjusting device 150 is controlled based on the backlight level to adjust a projection angle of the flashlight 160 (step 350). In this step, the angle adjusting device 150 is connected to the flashlight 160 and is operable to adjust the projection angle of the flashlight 160. Thus, the angle control module 185 controls the angle adjusting device 150 based on the backlight level, thereby adjusting the projection angle of the flashlight 160.

The backlight level in step 350 has been explained in the description regarding FIGS. 2A, 2B and 2C, and will not be further described herein. Furthermore, as shown in FIG. 2C, when the backlight level is 90 degrees, which represents that the sun is at the left side of the user, the angle control module 185 controls the angle adjusting device 150 based on the backlight level (90 degrees), so as to enable the flashlight 160 to fill light towards the right of the object to be photographed. In this way, a combination of the angle adjusting device 150 and the flashlight 160 can be used to alleviate the problem that the left side brightness and the right side brightness of an image of the photographed object are uneven in a semi-backlight situation.

After the projection angle of the flashlight 160 is adjusted, a focal distance of the object to be photographed is measured, and an intensity of the flashlight and a size of the shutter are adjusted based on the focal distance of the object to be photographed (step 360).

In step 360, an autofocus function of the camera module 120 can be used to measure the focal distance of the object to be photographed, and then the flashlight control module 186 can adjust the intensity of the flashlight based on the focal distance of the object to be photographed. In this step, the MPU 180 may further include a shutter control module, by which the size of the shutter can be adjusted based on the focal distance of the object to be photographed. For example, as the object to be photographed becomes farther away from the camera-based mobile communication device 100 (the focal distance becomes greater), the intensity of the flashlight is adjusted to be higher correspondingly. In this way, appropriate light compensation can be provided by the flashlight 160 for the object to be photographed, so that a brightness of an image of the photographed object becomes more even.

Figure 4:
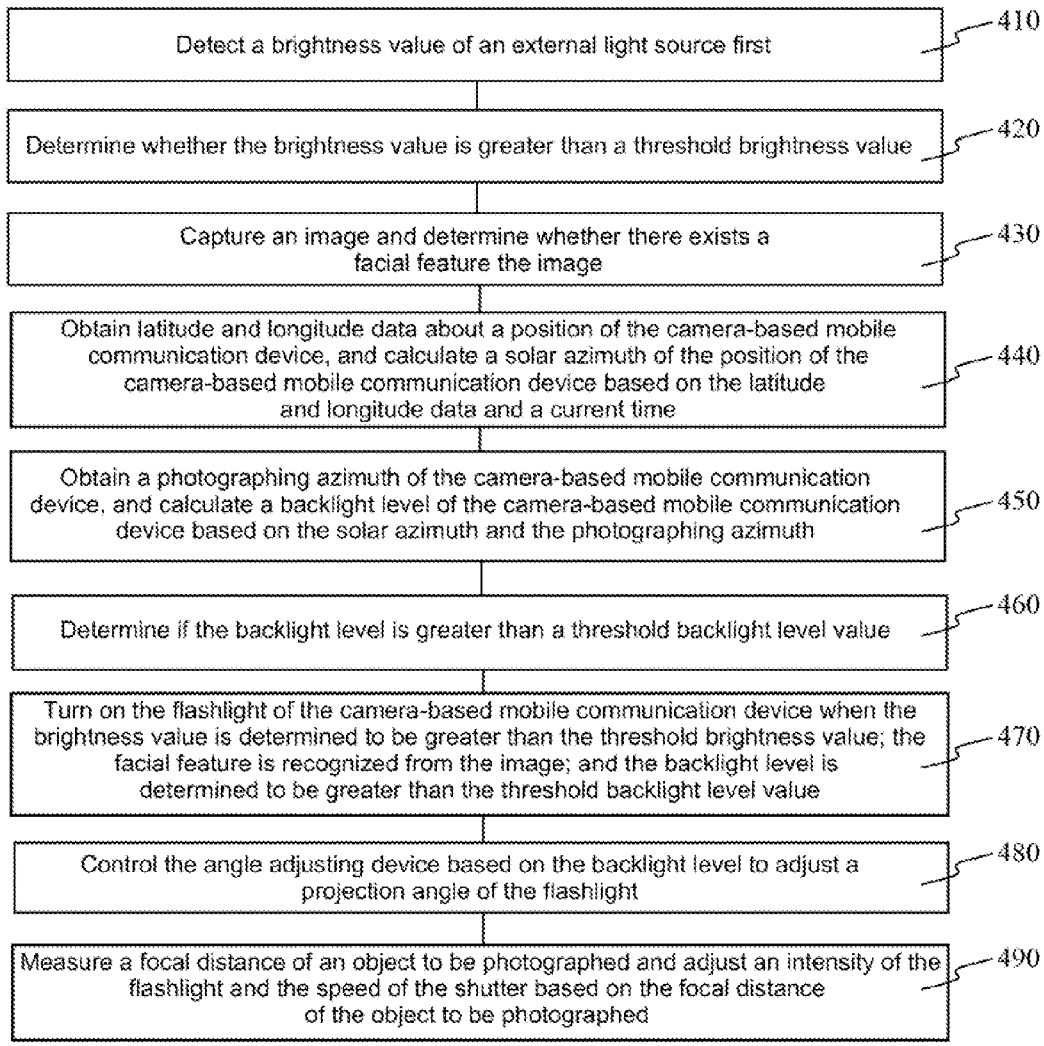
FIG. 4 is a flowchart showing a flashlight control method according to a further embodiment of the present invention.

FIG. 4 is a flowchart showing a flashlight control method according to a further embodiment of the present invention. Referring to both FIG. 1 and FIG. 4, a brightness value of an external light source is detected first (step 410), wherein the light sensor 110 can be used to detect the brightness value of the external light source. Next, it is determined whether the brightness value is greater than a threshold brightness value (step 420), wherein the comparison module 181 can be used to determine whether the brightness value is greater than the threshold brightness value.

Thereafter, an image is captured and it is determined whether there exists a facial feature in the image (step 430). In step 430, the camera module 120 can be used to capture the image, and the face recognizing module 182 can be used to determine whether there exists the facial feature in the image.

Subsequently, latitude and longitude data about a position of the camera-based mobile communication device 100 is obtained, and a solar azimuth of the position of the camera-based mobile communication device 100 is calculated based on the latitude and longitude data and a current time (step 440).

In step 440, the GPS module 130 can be used to obtain the latitude and longitude data about the position of the camera-based mobile communication device 100, and then the solar azimuth calculating module 183 can be used to calculate the solar azimuth of the position of the camera-based mobile communication device 100 based on the latitude and longitude data and the current time. Compared with the solar azimuth calculating module 183 which calculates the solar azimuth only based on the current time, if the camera-based mobile communication device 100 is equipped with the GPS module 130 to obtain the latitude and longitude data, the solar azimuth calculating module 183 can calculate a more accurate solar azimuth.

After the solar azimuth is calculated, a photographing azimuth of the camera-based mobile communication device is obtained, and a backlight level of the camera-based mobile communication device is calculated based on the solar azimuth and the photographing azimuth (step 450). In step 450, the electronic compass module 140 can be used to obtain the photographing azimuth of the camera-based mobile communication device 100, and then the backlight level calculating module 184 can be used to calculate the backlight level of the camera-based mobile communication device 100 based on the solar azimuth and the photographing azimuth. The backlight level has been explained in the description regarding FIGS. 2A, 2B and 2C, and will not be further described herein.

After the backlight level is calculated, it is determined whether the backlight level is greater than a threshold backlight level value (step 460). In this step, the comparison module 181 can be used to compare the backlight level with the threshold backlight level value, wherein the threshold backlight level value can be set by a manufacturer or the user himself/herself.

Furthermore, the flashlight 160 of the camera-based mobile communication device is turned on when the brightness value is determined to be greater than the threshold brightness value; the facial feature is recognized from the image; and the backlight level is determined to be greater than the threshold backlight level value (step 470).

In step 470, the flashlight control module 186 controls and turns on the flashlight 160 when the comparison module 181 determines that the brightness to value is greater than the threshold brightness value, the face recognizing module 182 recognizes the facial feature from the image and the backlight level is determined to be greater than the threshold backlight level value. In this Way, the threshold backlight level value can be set by the manufacturer or the user as required, so that the camera-based mobile communication device 100 can photograph and obtain a desirable image.

After the flashlight 160 is turned on, the angle adjusting device 150 is controlled based on the backlight level to adjust a projection angle of the flashlight 160 (step 480). In this step, the angle adjusting device 150 is connected to the flashlight 160 and is operable to adjust the projection angle of the flashlight 160. Thus, the angle control module 185 controls the angle adjusting device 150 based on the backlight level, thereby adjusting the projection angle of the flashlight 160.

In step 480, as shown in FIG. 2C, when the backlight level is 90 degrees, which represents that the sun is at the left side of the user, the angle control module 185 controls the angle adjusting device 150 based on the backlight level (90 degrees), so that the flashlight 160 fills light towards the right of the object to be photographed. In this way, a combination of the angle adjusting device 150 and the flashlight 160 can be used to alleviate the problem that the left brightness and the right brightness of an image of the photographed object are uneven in a semi-backlight situation.

After the projection angle of the flashlight 160 is adjusted, a focal distance of the object to be photographed is measured, and the intensity of the flashlight and the speed of the shutter are adjusted based on the focal distance of the object to be photographed (step 490).

In step 490, an autofocus function of the camera module 120 can be used to measure the focal distance of the object to be photographed, and then the flashlight control module 186 can adjust the intensity of the flashlight based on the focal distance of the object to be photographed. In this step, the MPU 180 may further include a shutter control module by which the speed of the shutter can be adjusted based on the focal distance of the object to be photographed. For example, as the object to be photographed becomes farther away from the camera-based mobile communication device 100 (the focal distance becomes greater), the intensity of the flashlight is adjusted to be higher correspondingly. In this way, appropriate light compensation can be provided by the flashlight 160 for the object to be photographed, so that a brightness of an image of the photographed object becomes more even.

As can be known from the above embodiments, the application of the present invention has the following advantages. The embodiments of the present invention provide a camera-based mobile communication device, thereby alleviating the problem that an object to be photographed may appear darker with respect to a background when the camera-based mobile communication device is under a backlight situation. Furthermore, the embodiments of the present invention adjust a projection angle of the flashlight by determining a solar azimuth, thereby alleviating the problem that a brightness of the object to be photographed is uneven when the camera-based mobile communication device is under a semi-backlight situation.

Although the present invention has been disclosed with reference to the above embodiments, these embodiments are not intended to limit the present invention. It will be apparent to those skilled in the art that various modifications and variations can be made without departing from the scope or spirit of the present invention. Therefore, the scope of the present invention should be defined by the appended claims.

What is claimed is:

1. A camera-based mobile communication device, comprising:
   a light sensor operable to detect a brightness value of an external light source;
   a camera module operable to capture an image;
   a flashlight operable to generate a flash; and
   a micro-processing unit (MPU) electrically connected to the light sensor, the camera module, and the flashlight, wherein the MPU comprises:
     a comparison module operable to compare the brightness value with a threshold brightness value; and
     a face recognizing module operable to determine whether there exists a facial feature in the image; and
     a flashlight control module operable to turn on the flashlight when the comparison module determines that the brightness value is greater than the threshold brightness value and the face recognizing module recognizes the facial feature from the image.

2. The camera-based mobile communication device of claim 1, further comprising:
   a global positioning system (GPS) module operable to obtain a latitude and longitude data about the position of the camera-based mobile communication device;
   wherein the MPU further comprises a solar azimuth calculating module operable to calculate the solar azimuth of the position of the camera-based mobile communication device based on the latitude and longitude data and a current time.

3. The camera-based mobile communication device of claim 1, further comprising:
   an electronic compass module operable to obtain a photographing azimuth of the camera-based mobile communication device;
   wherein the MPU further comprises a backlight level calculating module operable to calculate a backlight level of the camera module based on the solar azimuth and the photographing azimuth, wherein the comparison module is further operable to compare the backlight level with a threshold backlight level value, and the flashlight control module controls and turns on the flashlight to be turned on when the comparison module determines that the brightness value is greater than the threshold brightness value; the face recognizing module recognizes the facial feature from the image; and the backlight level is greater than the threshold backlight level value.

4. The camera-based mobile communication device of claim 2, further comprising:
   an electronic compass module operable to obtain a photographing azimuth of the camera-based mobile communication device;
   wherein the MPU further comprises a backlight level calculating module operable to calculate a backlight level of the camera module based on the solar azimuth and the photographing azimuth, wherein the comparison module is further operable to compare the backlight level with a threshold backlight level value, and the flashlight control module controls and turns on the flashlight to be turned on when the comparison module determines that the brightness value is greater than the threshold brightness value; the face recognizing module recognizes the facial feature from the image; and the backlight level is greater than the threshold backlight level value.

5. The camera-based mobile communication device of claim 1, further comprising:
   an angle adjusting device connected to the flashlight and operable to adjust a projection angle of the flashlight;
   wherein the MPU further comprises an angle control module operable to control the angle adjusting device based on the backlight level.

6. The camera-based mobile communication device of claim 2, further comprising:
   an angle adjusting device connected to the flashlight and operable to adjust a projection angle of the flashlight;
   wherein the MPU further comprises an angle control module operable to control the angle adjusting device based on the backlight level.

7. The camera-based mobile communication device of claim 3, further comprising:
   an angle adjusting device connected to the flashlight and operable to adjust a projection angle of the flashlight;
   wherein the MPU further comprises an angle control module operable to control the angle adjusting device based on the backlight level.

8. The camera-based mobile communication device of claim 4, further comprising:
an angle adjusting device connected to the flashlight and operable to adjust a projection angle of the flashlight;
wherein the MPU further comprises an angle control module operable to control the angle adjusting device based on the backlight level.

9. The camera-based mobile communication device of claim 1, further comprising:
a flashlight lens disposed on a light-emitting path of the flashlight and operable to concentrate the flash; and
an angle adjusting device connected to the flashlight lens and operable to adjust an angle of the flashlight lens;
wherein the MPU further comprises an angle control module operable to control the angle adjusting device based on the backlight level.

10. The camera-based mobile communication device of claim 2, further comprising:
a flashlight lens disposed on a light-emitting path of the flashlight and operable to concentrate the flash; and
an angle adjusting device connected to the flashlight lens and operable to adjust an angle of the flashlight lens;
wherein the MPU further comprises an angle control module operable to control the angle adjusting device based on the backlight level.

11. The camera-based mobile communication device of claim 3, further comprising:
a flashlight lens disposed on a light-emitting path of the flashlight and operable to concentrate the flash; and
an angle adjusting device connected to the flashlight lens and operable to adjust an angle of the flashlight lens;
wherein the MPU further comprises an angle control module operable to control the angle adjusting device based on the backlight level.

12. The camera-based mobile communication device of claim 4, further comprising:
a flashlight lens disposed on a light-emitting path of the flashlight and operable to concentrate the flash; and
an angle adjusting device connected to the flashlight lens and operable to adjust an angle of the flashlight lens;
wherein the MPU further comprises an angle control module operable to control the angle adjusting device based on the backlight level.

13. A flashlight control method, applicable to a camera-based mobile communication device, wherein the camera-based mobile communication device comprises a flashlight, the method comprising:
detecting a brightness value of an external light source;
determining whether the brightness value is greater than a threshold brightness value;
capturing an image and determining whether there exists a facial feature in the image; and
turning on the flashlight of the camera-based mobile communication device when the brightness value is determined to be greater than the threshold brightness value and the facial feature is recognized from the image.

14. The method of claim 13, further comprising:
obtaining a latitude and longitude data about the position of the camera-based mobile communication device, and calculating a solar azimuth of the position of the camera-based mobile communication device based on the latitude and longitude data and a current time; and
calculating a backlight level of the camera-based mobile communication device based on the solar azimuth.

15. The method of claim 14, further comprising:
obtaining a photographing azimuth of the camera-based mobile communication device, and calculating the backlight level of the camera-based mobile communication device based on the solar azimuth and the photographing azimuth;
determining whether the backlight level is greater than a threshold backlight level value; and
turning on the flashlight of the camera-based mobile communication device when the brightness value is determined to be greater than the threshold brightness value; the facial feature is recognized from the image; and the backlight level is determined to be greater than the threshold backlight level value.

16. The method of claim 15, further comprising:
controlling an angle adjusting device based on the backlight level so as to adjust a projection angle of the flashlight.

17. The method of claim 13, further comprising:
measuring a focal distance of an object to be photographed, and adjusting the intensity of the flashlight and the speed of a shutter based on the focal distance of the object to be photographed.

18. The method of claim 14, further comprising:
measuring a focal distance of an object to be photographed, and adjusting the intensity of the flashlight and the speed of a shutter based on the focal distance of the object to be photographed.

19. The method of claim 15, further comprising:
measuring a focal distance of an object to be photographed, and adjusting the intensity of the flashlight and the size of a shutter based on the focal distance of the object to be photographed.

20. The method of claim 16, further comprising:
measuring a focal distance of an object to be photographed, and adjusting the intensity of the flashlight and the speed of a shutter based on the focal distance of the object to be photographed.

* * * * *